United States Patent [19]

Belfoure

[11] Patent Number: 4,464,497

[45] Date of Patent: Aug. 7, 1984

[54] CARBON BLACK FILLED FLAME RETARDANT POLYCARBONATE COMPOSITIONS

[75] Inventor: Edward L. Belfoure, New Harmony, Ind.

[73] Assignee: General Electric Company, Mt. Vernon, Ind.

[21] Appl. No.: 449,981

[22] Filed: Dec. 15, 1982

[51] Int. Cl.$^3$ ............................................. C08K 5/52
[52] U.S. Cl. .................................. 524/114; 524/151; 524/161; 524/162; 524/496; 524/605
[58] Field of Search ............... 524/151, 114, 496, 161, 524/162, 605

[56] References Cited

U.S. PATENT DOCUMENTS

| | | | |
|---|---|---|---|
| 3,305,520 | 12/1967 | Fritz et al. | 524/151 |
| 3,419,460 | 12/1968 | Ure | 524/496 |
| 3,560,441 | 2/1971 | Schwarcz | 524/409 |
| 3,909,490 | 9/1975 | Mark | 524/82 |
| 3,919,167 | 11/1975 | Mark | 524/84 |
| 3,926,908 | 12/1975 | Mark | 524/160 |
| 3,931,100 | 1/1976 | Mark | 524/164 |
| 3,933,734 | 11/1976 | Mark | 524/160 |
| 3,948,851 | 4/1976 | Mark | 524/82 |
| 3,953,396 | 4/1976 | Mark | 524/84 |
| 3,998,908 | 12/1976 | Buxbaum | 524/605 |
| 4,066,618 | 1/1978 | Mark | 524/395 |
| 4,197,384 | 4/1980 | Bialous et al. | 524/114 |

*Primary Examiner*—V. P. Hoke
*Attorney, Agent, or Firm*—Martin B. Barancik

[57] ABSTRACT

A flame retarded black thermally and hydrolytically stabilized copolyester carbonate having reasonable melt stability is achieved with a relatively low surface area carbon black.

13 Claims, No Drawings

CARBON BLACK FILLED FLAME RETARDANT POLYCARBONATE COMPOSITIONS

BACKGROUND OF THE INVENTION

Copolyester carbonates are well known in the art for their relatively high mechanical and tensile strength as well as their distortion temperature under load. As with other engineering thermoplastics, the presence of various stabilizers and additives are usually necessary to stabilize or upgrade certain properties of a copolyester-carbonate while retaining the other properties of the resin to as great a degree as possible. It is of course important for the various additives and/or stabilizers to be essentially inert to the polymer and to have the various combinations of additives and/or stabilizers present in the composition have a total effect which is not significantly adverse to the polymer.

The color of a resin can be an important application feature. To obtain a specific resin color, particular additives known as pigments are generally employed. Many times a black color is achieved with the pigment carbon black.

A further significant feature of a resin application is its flammability rating. In order to qualify a resin for a certain application a certain inflammability rating must not be exceeded. Such a rating is often times achieved by adding a flame retardant additive to the resin.

Generally the presence of flame retardant additives and color pigments in the same resin composition does not bring about resin instability.

SUMMARY OF THE INVENTION

It has recently been discovered that certain copolyester carbonate compositions are subjected to melt instability as shown by severe melt degradation. This degradation occurs when certain carbon black pigments are in the composition with an organic sulfonic acid salt flame retardant as well as the typical thermal and hydrolytic stabilizers. It has also been discovered that such degradation is markedly retarded when a carbon black having a certain feature is used in the composition.

Therefore in accordance with the invention, there is a composition comprising a thermally and hydrolytically stabilized high molecular weight copolyester carbonate in admixture with a. a flame retardant effective amount of a metal salt of an organic sulfonic acid; and b. a black pigmenting effective amount of a carbon black of such low surface area that melt degradation is markedly retarded.

DETAILED DESCRIPTION OF THE INVENTION

The copolyester carbonates which are generally useful in the present invention and their methods of preparation are well known in the art as disclosed in U.S. Pat. No. 3,169,121; 3,030,331; 4,194,038; 4,156,069 and 4,238,596, all of which are incorporated by reference.

The copolyester-carbonates can generally be termed copolyesters containing carbonate groups, carboxylate groups, and aromatic carbocyclic groups in the polymer chain, in which at least some of the carboxylate groups and at least some of the carbonate groups are bonded directly to ring carbon atoms of the aromatic carbocyclic groups. These polyester-carbonates are, in general, prepared by reacting a difunctional carboxylic acid or a reactive derivative of the acid such as the acid dihalide, a dihydric phenol and a carbonate precursor.

The dihydric phenols useful in formulating the polyestercarbonates which are of use in the practice of the present invention are in general represented by the general formula

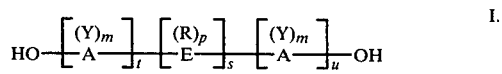

wherein A represents an aromatic group such as phenylene, biphenylene, naphthylene, etc. E may be an alkylene or alkylidene group such as methylene, ethylene, propylene, prolylidene, isopropylidene, butylene, butylidene, isobutylidene, amylene, isoamylene, amylidene, isoamylidene, etc. Where E is an alkylene of alkylidene group, it may also consist of two or more alkylene or alkylidene groups connected by a non-alkylene or non-alkylidene group such as an aromatic linkage, a teritiary amino linkage, an ether linkage, a carbonyl linkage, a silicon-containing linkage, or by a sulfur-containing linkage such a sulfide, sulfoxide, sulfone, etc. In addition, E may be a cycliaphatic group (e.g., cyclophentyl, cyclohexyl, etc.); a sulfur containing linkage, such as sulfide, sulfoxide or sulfone; an ether linkage; a carbonyl group; a tertiary nitrogen group; or a silicon-containing linkage such as silane or siloxy. R represents hydrogen or a monovalent hydrocarbon group such as alkyl (methyl, ethyl, propyl, etc.), aryl (phenyl, naphthyl, etc.), aralkyl (benzyl, ethylphenyl, etc.), alkaryl, or cycloaliphatic (cyclopentyl, cyclohexyl, etc.). Y may be an inorganic atom such as halogen (flourine, bromine, chlorine, iodine), an inorganic group such as the nitro group, an organic group such as R above, or an oxy group such as OR, it being only necessary that Y be inert to and unaffected by the reactants and reaction conditions. The letter m represents any integer from and including zero through the number of positions on A available for substitution; p represents an integer from and including zero through the number of positions on E available for substitution; t represents an integer equal to at least one; s is either zero or one; and u represents any integer including zero.

In the dihydric phenol compound represented by Formula I above, when more than one Y substituent is present, they may be the same or different. The same hold true for the R substituent. Where s is zero in Formula I and u is not zero, the aromatic rings are directly joined with no intervening alkylene or other bridge. The positions of the hydroxyl groups and Y on the aromatic nuclear residues A can be varied in the ortho, meta, or para positions and the groupings can be in vicinal, asymmetrical or symmetrical relationship, where two or more ring carbon atoms of the hydrocarbon residue are substituted with Y and hydroxyl groups.

Some nonlimiting examples of dihydric phenols falling within the scope of Formula I include:
2,2-bis(4-hydroxyphenyl)propane (bisphenol A);
2,4'-dihydroxydiphenylmethane;
bis(2-hydroxyphenyl)methane;
bis(4-hydroxyphenyl)methane;
bis(4-hydroxy-5-propylphenyl)methane;
bis(4-hydroxy-2,6-dimethyl-3-methoxyphenyl)methane;
1,1-bis(4-hydroxyphenyl)ethane;
1,1-bis(4-hydroxy-2-ethylphenyl)ethane;

2,2-bis(3-phenyl-4-hydroxyphenyl)propane;
bis(4-hydroxyphenyl)cyclohexylmethane; and
2,2-bis(4-hydroxyphenyl)-1-phenylpropane.

Bisphenols other than those having a carbon atom between the two phenols can also be employed. Examples of such groups of bisphenols include bis(hydroxyphenyl) sulfides, bis(hydroxyphenyl)ethers and bis(hydroxyphenyl) sulfoxides and the like.

These dihydric phenols may be used alone or as mixtures of two or more different dihydric phenols.

In general, any difunctional carboxylic acid or its reactive derivative such as the acid dihalide conventionally used in the preparation of polyesters may be used for the preparation of the polyestercarbonates useful in formulating the flame retardant non-dripping compositions of the present invention. In general, the carboxylic acids which may be used are aliphatic carboxylic acids, aliphatic-aromatic carboxylic acids, or aromatic carboxylic acids. The aromatic dicarboxylic acids or their reactive derivatives such as the aromatic acid dihalides are preferred as they produce the aromatic polyestercarbonates which are most useful in the practice of the present invention.

These carboxylic acids may be represented by the general formula $$R^2-(R^1)_q-COOH \qquad \text{II.}$$

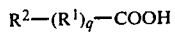

wherein $R^1$ represents and alkylene, alkylidene or cycloaliphatic group in the same manner as set out above for E in Formula I; an alkylene, alkylidene or cycloaliphatic group containing ethylenic unsaturation; an aromatic radical such as phenylene, nathylene, biphenylene, substituted phenylene, etc.; two or more aromatic groups connected through non-aromatic linkages such as those defined by E in formula I; or an aralkyl radical such as tolylene, xylene, etc. $R^2$ is either a carboxyl or a hydroxyl group. The letter q represents one where $R^2$ is a hydroxyl group and either zero or one wherein $R^2$ is a carboxyl group. Thus the difunctional acid will either be a monohydroxy monocarboxylic acid or a dicarboxylic acid. For purposes of the present invention the dicarboxylic acids or their reactive derivatives such as the acid dihalides are preferred, with the aromatic dicarboxylic acids or their dihalides being more preferred. Thus, in these more preferred acids $R^2$ is a carboxyl group and $R^1$ is a divalent aromatic radical such as phenylene, naphthylene, biphenylene, substituted phenylene, etc.; two or more aromatic groups connected through non-aromatic linkages; or a divalent aralkyl group. Some nonlimiting examples of suitable preferred aromatic and aliphatic-aromatic dicarboxylic acids which may be used in preparing the polyestercarbonates useful in the practice of the present invention include phthalic acid, isophthalic acid, terephthalic acid, homophthalic acid, o-, m-, and p-phenylenediacetic acid; the poly-nuclear aromatic acids such as diphenic acid, and 1,4-naphthalic acid.

These acids may be used either individually or as a mixture of two or more different acids.

The carbonate precursor may be a carbonyl halide, a carbonate ester or a haloformate. The carbonyl halids which can be employed herein are carbonyl chloride, carbonyl bromide and mixtures thereof. Typical of carbonate esters which may be employed herein are diphenyl carbonate, di(halophenyl)carbonates such as di(chlorophenyl)carbonate, di(bromophenyl) carbonate, di(trichlorophenyl)carbonate, di(tribromophenyl)carbonate, etc.; di(alkylphenyl) carbonates such as di(tolyl)carbonate, etc., di(naphthyl)carbonate, di(chloronaphthyl)carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or gylcols (bishaloformates of ethylene glycol, neopentyl glycol, polyethylene glycol, etc.). Carbonyl chloride, also known as phosgene, is preferred.

Also present during the co-reaction between the dihydric phenol, the carbonate precursor and the dicarboxylic acid or its reactive derivative are catalysts, molecular weight regulators, and acid acceptors. Examples of suitable molecular weight regulators include phenol, p-tertiary butyl phenol, etc. Examples of suitable catalysts include tertiary amines, quaternary ammonium compounds, quaternary phosphonium compounds, etc. Examples of suitable acid acceptors include tertiary amines, alkali or alkaline earth metal hydroxides, etc.

The copolyester-carbonates which are particularly useful in the practice of the present invention are the aromatic polyester-carbonates derived from dihydric phenols, aromatic dicarboxylic acids or their reactive derivatives such as the aromatic acid dihalides, e.g. dichlorides, and a carbonate precursor such as phosgene. A quite useful class of aromatic polyester-carbonates are those derived from bisphenol A; terephthalic acid, isophthalic acid, or a mixture thereof or terephthaloyl dichloride, isophthaloyl dichloride, or a mixture thereof; and phosgene. If a mixture of terephthaloyl and isophthaloyl dichloride is utilized the ratio by weight of terephthaloyl dichloride to isophthaloyl dichloride is from about 20:90 to 90:10.

Any thermally and hydrolytically stabilized copolyester carbonate, particularly an aromatic copolyester carbonate which is susceptible to substantial melt degradation when both a relatively high surface area carbon black pigment and a metal salt of an organic sulfonic acid are present in the composition can be used in the composition. It should be noted that this problem does not occur when a relatively high surface area carbon black pigment and a metal salt of an organic sulfonic acid are present in a stabilized aromatic polycarbonate. Generally the mole percent of ester bonds of the copolyester carbonate is from about 25 to about 90 percent, preferably from about 35 to about 80 mole percent. The remainder of the bonds are carbonate bonds, from about 10 to 75 and preferably about 20 to about 65 mole percent. For example, 5 moles of bisphenol A reacting completely with 4 moles of isophthaloyl chloride and 1 mole of phosgene would give a copolyester carbonate of 80 mole percent ester bonds.

Any metal salt of an organic sulfonic acid which provides flame retardant activity in a copolyester carbonate can be used in the composition. Generally, if such a compound flame retards a polycarbonate, it will also flame retard a copolyester carbonate, particularly an aromatic copolyester carbonate. Examples of such cationic moieties of flame retardant compounds include alkali and alkaline earth metal salts such as sodium, potassium, calcium, barium and the like. The organic moiety of the salt is generally an aromatic or perfluoro halogenated group with a sulfonic acid substituent. Examples of such organic moieties include perfluoro butyl sulfonic acid, perfluorooctyl sulfonic acid, benzene sulfonic acid, trichlorobenzene sulfonic acid, p-benzene sulfonyl benzene sulfonic acid and the like. Examples of patents disclosing such salts include

| | |
|---|---|
| U.S. Pat. No. 3,933,734 | U.S. Pat. No. 3,931,100 |
| U.S. Pat. No. 3,948,851 | U.S. Pat. No. 3,953,396 |
| U.S. Pat. No. 3,926,908 | U.S. Pat. No. 3,909,490 |
| U.S. Pat. No. 3,919,167 | U.S. Pat. No. 4,066,618 |

An amount of flame retardant agent which is effective to flame retard the copolyester carbonate and which is sufficient to cause the observed severe melt degradation when employed in combination with relatively high surface area carbon black pigments is within the scope of the invention. The minimum amount of flame retardant in such compositions which experience the severe melt degradation is dependent upon the specific composition components, including the specific thermally and hydrolytically stabilized copolyester carbonate, flame retardant and carbon black employed. Generally about 0.1 to about 3.0 weight percent of flame retardant is effective.

The general thermal stabilizers for polycarbonate particularly the phosphites, see U.S. Pat. No. 3,305,520 incorporated by reference herein and other related patents are effective thermal stabilizers for copolyester carbonates and are within the scope of the invention. The usual hydrolytic stabilizers particularly the epoxides, see U.S. Pat. No. 4,197,384 incorporated by reference herein and other related patents are effective hydrolytic stabilizers. In addition the epoxides also function as a trap for phosphorous acid released from the phosphite stabilizer. The stabilizers are used in their standard and accepted stabilizing quantities.

The carbon black pigment employed in the composition of this invention should have a sufficiently low surface area so that any melt degradation observed is acceptable. In general, a surface area of less than about 150 $m^2/gm$ as measured by nitrogen adsorption using the method of Brunauer-Emmett-Teller is acceptable. It is preferable to have a surface area of less than about 100 $m^2/gm$ and more preferably below about 70 $m^2/gm$. A sufficient amount of carbon black pigment should be employed to achieve the desired color and opacity. Suitable carbon black pigments are commercially available as pellets. These pigments include Sterling SO and Regal 3001 both available from Cabot Corporation.

The composition including the flame retardant additive and carbon black pigment is prepared by standard procedures. For example, the additives can be blended in an extruder with the copolyester carbonate.

EXAMPLES

Below are examples of the invention and comparative examples showing specific situations outside the claimed subject matter. These examples are intended to illustrate rather than narrow the inventive concept.

PREPARATION

An aromatic copolyester carbonate having 65 mole percent ester bonds is prepared in a process similar to U.S. Pat. No. 4,238,596 of each of BPA and acid dichlorides. The diphenol is bisphenol A. The aromatic diacid chloride employed is an 85:15 mole percent mixture of terephthalic diacid chloride:
isophthalic diacid chloride. The resin powder is extruded with 0.03 parts per hundred (phr) of a phosphite stabilizer 0.1 phr of an epoxy stabilizer and 0.2 phr of a silicone oil, 0.4 phr of sodium trichlorobenzene sulfonate (STB) or potassium diphenyl sulfone sulfonate (KSS) as well as 0.35 phr of various carbon black pigments in each example. Parts of ⅛ inch thickness (size) were injection molded from the pellets produced by the extruder. The Kasha Index (KI), a measure of melt viscosity was measured for the pellets of each example. Below are the specific examples and the results therefrom

COMPARATIVE EXAMPLE 1

In this example the KI of the powder alone was 59,000.

| | KI | % Drop in KI from Powder |
|---|---|---|
| Carbon black (210 $m^2/gm$) | 57,300 | 3 |
| Carbon black (210 $m^2/gm$) and KSS | 35,670 | 40 |

The above data shows the effect of a relatively high surface area carbon black on the melt viscosity of the copolyester carbonate. Without the flame retardant agent present, the percent drop from the powder melt viscosity (KI) is only about 3% when the relatively high surface area carbon black is present. However when a small amount of flame retardant is present the drop in melt viscosity is approximately 40% measured by KI. This drop is considered to be excessive.

COMPARATIVE EXAMPLE 2

In this example, the KI of the powder alone was 43,000.

| | KI | % Drop in KI from Powder |
|---|---|---|
| Carbon black (210 $m^2/gm$) | 39,000 | 9.3 |
| STB | 34,530 | 19.7 |
| Carbon black (210 $m^2/gm$) and STB | 19,055 | 55.7 |

The presence of either the carbon black or the flame retardant brings about only a relatively small reduction in melt viscosity. However, the two components together bring about a very large reduction in melt viscosity.

COMPARATIVE EXAMPLE 3

| | KI | % Drop in KI from Powder |
|---|---|---|
| No phosphite or epoxide but carbon black (210 $m^2/gm$) and KSS | 35,890 | 16.5 |
| Epoxide plus carbon black (210 $m^2/gm$) and KSS | 28,070 | 34.8 |
| Epoxide plus phosphite plus carbon black (210 $m^2/gm$) and KSS | 26,580 | 38.1 |

This data shows the significance of the thermal and hydrolytic stabilizer. When both are absent, the drop in melt viscosity is acceptable. However when the phosphite is absent, the drop in melt viscosity is significant. When both the phosphite and epoxide are present, the drop is even more significant. If only the phosphite were present, the epoxide being absent, the KI drop should be even more substantial since the phosphorous acid generated from the resin would not be trapped by the epoxide.

EXAMPLE 1

In this example the KI of the powder alone is 59,000.

|  | KI | % Drop in KI from Powder |
|---|---|---|
| Carbon black (40 m²/gm) | 48,350 | 16.3 |
| Carbon black (40 m²/gm) and KSS | 45,105 | 23.5 |

In this example, the relatively small surface area carbon black provides only a 23.5% drop in melt viscosity. When used in combination with a flame retardant. This compares very favorably with comparative Example 1 wherein a drop of 40% is observed. Both examples utilize the same powder.

EXAMPLE 2

In this example, the KI of the powder alone is 43,000. The samples were extruded from a commercially sized extruder.

|  | KI | % Drop in KI from Powder |
|---|---|---|
| Carbon black (210 m²/gm) and STB | 18,646* | 56.6 |
| Carbon black (40 m²/gm) and STB | 30,250 | 29 |

*Average of five runs

In this example, the relatively small surface area carbon black provides only a 23% drop in melt viscosity in comparison with the relatively large surface area carbon black providing a 56.6% drop in melt viscosity.

In all of the above examples, the carbon black having 210 m²/gm is Black Pearls 800 and the carbon black having 40 m²/gm is Sterling ® SO, each available from Cabot.

The KI reported in the data is a measure of the processability of the resin, the lower the KI the greater the melt flow rate. The procedure for determining the KI is as follows: 7 grams of resin, dried a minimum of 90 minutes at 125° C., are added to a modified Tinius-Olsen model T3 melt indexer; the temperature in the indexer is maintained at 300° C. and the resin is heated at this temperature for 6 minutes; after 6 minutes the resin is forced through a 0.04125 inch radius orifice using a plunger of radius 0.1865 inch and an applied force of 17.7 lbs.; the time required for the plunger to travel two inches is measured in centiseconds; this is reported as the KI.

What is claimed is:

1. A composition comprising a thermally and hydrolytically stabilized high molecular weight copolyester carbonate in admixture with
   a. a flame retardant effective amount of a metal salt of an organic sulfonic acid; and
   b. a black pigmenting effective amount of a carbon black of such low surface area that melt degradation is markedly retarded, said carbon black having a surface area of less than about 150 me²/gm.
2. The composition in accordance with claim 1 wherein the copolyester carbonate is an aromatic copolyester carbonate.
3. The composition in accordance with claim 1 wherein the copolyester carbonate has been thermally stabilized by a phosphite.
4. The composition in accordance with claim 1 wherein the copolyester carbonate has been hydrolytically stabilized by an epoxide.
5. The composition in accordance with claim 2 wherein the copolyester carbonate has been thermally stabilized by a phosphite and hydrolytically stabilized by an epoxide.
6. The composition in accordance with claim 1 wherein the carbon black has less than about 100 me²/gm surface area.
7. The composition in accordance with claim 1 wherein the carbon black has less than about 70 me²/gm surface area.
8. The composition in accordance with claim 4 wherein the copolyester carbonate is derived from bisphenol A, an acid or acid chloride selected from isophthalic, terephthalic or a mixture of isophthalic and terephthalic, and the carbon black has less than about 100 m²/gm surface area.
9. The composition in accordance with claim 8 wherein the carbon black has less than about 70 me²/gm.
10. The composition in accordance with claim 8 wherein the metal salt of an organic sulfonic acid is sodium 2,4,5-trichlorobenzene sulfonate.
11. The composition in accordance with claim 8 wherein the metal salt of the organic sulfonic acid is potassium diphenylsulfone-3-sulfonate.
12. The composition in accordance with claim 9 wherein the metal salt of the organic sulfonic acid is sodium 2,4,5-trichlorobenzene sulfonate.
13. The composition in accordance with claim 9 wherein the metal salt of the organic sulfonic acid is potassium diphenylsulfone-3-sulfonate.

* * * * *

UNITED STATES PATENT AND TRADEMARK OFFICE
CERTIFICATE OF CORRECTION

PATENT NO. : 4,464,497

DATED : August 7, 1984

INVENTOR(S) : Edward L. Belfoure

It is certified that error appears in the above-identified patent and that said Letters Patent is hereby corrected as shown below:

Column 6, line 53, after "COMPARATIVE EXAMPLE 3"

should read "In this example the KI of the powder alone is 43,000."

Signed and Sealed this

Fifth Day of August 1986

[SEAL]

Attest:

DONALD J. QUIGG

Attesting Officer

Commissioner of Patents and Trademarks